[11] 3,558,865

| | | | |
|---|---|---|---|
| [72] | Inventors | Carl W. Berndt Danville; Frederick Reinecker, Jr.; Willis G. Downing, Jr., Livermore, Calif. | |
| [21] | Appl. No. | 628,244 | |
| [22] | Filed | Mar. 31, 1967 | |
| [45] | Patented | Jan. 26, 1971 | |
| [73] | Assignee | The United States of America as represented by the United States Atomic Energy Commission | |

[54] WEAPONS EFFECT DISPLAY SYSTEM
3 Claims, 4 Drawing Figs.

[52] U.S. Cl. ............................................. 235/151, 235/151.32; 35/25, 353/11, 353/31; 340/324
[51] Int. Cl. ....................................................... G03b 29/00
[50] Field of Search .......................................... 35/25; 235/151; 340/324

[56] References Cited
UNITED STATES PATENTS

| | | | | |
|---|---|---|---|---|
| 2,996,244 | 8/1961 | Kissin | | 235/184(X) |
| 2,998,193 | 8/1961 | Skramstad et al. | | 35/25 |
| 3,007,257 | 11/1961 | Mortimer | | 35/25(X) |
| 3,387,084 | 6/1968 | Hine et al. | | 340/324.1 |

*Primary Examiner*—Eugene G. Botz
*Attorney*—Roland A. Anderson

ABSTRACT: A system for displaying simulated post detonation "effects" of a nuclear device on a geographical map. Comprising a geographical plotter and a multiplicity of analogue computers for storing the functional relationships between yield characteristics of a nuclear device, manner of detonation and environmental conditions on one hand, and the "effects" resulting from detonation on the other. In response to input signal data corresponding to the variables of these functional relationships, the analogue computers issue output signals representative of the associated magnitudes and ranges of the "effects" and concurrently therewith such range signals are utilized to project and superimpose variable dimensional figures onto a geographical map by means of the plotter. The area on the map encompassed by each figure indicates the geographical extent subjected to the corresponding simulated nuclear detonation "effect."

Fig. 1a

INVENTORS
Carl W. Berndt
Willis G. Downing, Jr.
Frederick Rienecker, Jr.

WEAPONS EFFECT DISPLAY SYSTEM

BACKGROUND OF THE INVENTION

The invention relates to automated display systems. More particularly, a specific embodiment of the invention relates to a method and apparatus for calculating and visually displaying simulated post detonation "effect" of a nuclear device on a geographical map, wherein the map exhibits a scaled relationship with the predicted distances of the propagation of the simulated "effects."

Although the system is widely applicable to the solution of many kinds of problems, the invention is best disclosed in the context of problems related to nuclear weapon deployment and defense. The event of a nuclear detonation is characterized by certain destructive effects, the accurate assessment and prediction of which is the key to intelligent use and prudent countermeasures. The total destructive result is generally a combination of three primary "effects": direct radiation; blast; and thermal. There is also a secondary "effect," radioactive fallout. In the order of their incidence at any location, the first of these primary "effects" is radiation, such as electromagnetic radiation (e.g., gamma rays) and particle radiation (e.g., neutron flux) emitted directly as a result of the explosion. The second phenomenon is a blast effect, characterized by a shock wave and a general increase in the atmospheric pressure surrounding the detonated device. Both of these blast effects spread spherically from the point of detonation. The third primary effect is a thermal flux, propagated through the surrounding atmosphere, and consisting of intense long wave radiation and extremely high temperature gases. These primary effects are of particular importance in the embodiment of the invention disclosed herein, and will be referred to again. The secondary effect or fallout consists of radioactive materials produced in the device itself, as well as by irradiation of natural materials at the detonation site. The magnitude of each of these phenomena is essentially determined by the type and nature of the nuclear device, and by the environmental conditions at the time and place of detonation. The effect produced by each of these phenomena depends, of course, on the geographical location at which the effect is measured. Direct radiation, blast and thermal effects generally exhibit characteristic propagation patterns which may be predetermined and organized into useful relationships, while fallout is more volatile, strongly depending on meteorological conditions, such as wind direction, etc.

The specific parameters upon which the magnitude of the effects at any point depends are, first, those which are device-related. The most useful quantity is the yield of the device which is generally given in terms of an equivalent weight of the chemical explosive TNT. Also, the type of nuclear device, e.g., fission or fusion, is a significant characteristic. A third factor concerns the height above ground at which the device is detonated. For example, the propagation of direct radiation is sharply attenuated for devices detonated close to the earth's surface, as compared to deployment at an altitude of several hundred feet. Other influential factors include environmental conditions such as air density, and visibility, which affect the propagation of the effects through the intervening atmosphere, and radiation shielding factors which measure the susceptibility of particular targets to radiation, and vulnerability factors which indicated the relative immunity of certain targets to blast pressures.

Through empirical and analytical studies, the art has developed functional relationships which allow for calculation of a magnitude for each of the above primary effects at any desired point distal a detonated device. For example, an approximate thermal flux magnitude in cal/cm2 at a given range distance may be calculated from data pertaining to a select yield and height of burst. A more accurate computation would include the environmental conditions and the resulting destructive effect at such distance could be specified by introducing the shielding and vulnerability factors.

Commonly, nuclear detonation "effects" are derived by calculating each individual "effect" as a function of ground range for a series of incremental values of the above data parameters. Placed in tabular form, the results of such calculations are used as a reference source for determining the "effects" attendant a particular set of independent variables, e.g., type of device and manner of detonation. It is apparent that employment of these reference tables is unsatisfactory where a rapid assessment of the overall "effects" and the geographical distribution thereof is required. Furthermore, where it is desirable to vary a single independent parameter to determine changes in a post detonation "effects" pattern occasioned solely therefor, use of reference tables is patently cumbersome.

SUMMARY OF INVENTION

In general, the present invention provides a method and apparatus for automatically calculating solutions to a plurality of functions and graphically displaying these solutions simultaneously on a common background chart. Concurrently, numerical values representative of the graphical solutions are displayed by suitable meter or digital readout means. Significantly, the variables of those solutions graphically presented have identical dimensions, such as a coordinate system of variables $x$ and $y$. For example, the graphical solutions may be a plurality of circles, functions of $x$ and $y$, which are displayed on the background chart, while a digital readout means provides a display of the numerical boundary values satisfying the graphically displayed solutions.

The invention may be characterized as comprising three components:

1. a computer which stores the functional relationships pertinent to the problem or event to be assessed, accompanied by the necessary input means for feeding specific values of given variables into the computer and the necessary output means for sending electrical analogue signals for each of the variables; both given and computed to the respective display units;
2. a plotter, which may be regarded as the heart of the graphical display, which includes a plurality of tracers, i.e., one for each variable of the above functions. For example, a plotter may be provided for each variable of a set of $x$–$y$ coordinate solutions as provided by the computer. In addition, each tracer is capable of responding to the commands of an operator to trace a desired $x$–$y$ coordinate solution in which case the boundary values corresponding to the selected solution are automatically calculated; and
3. finally, the system comprises a means, e.g., digital readout, for displaying the numerical boundary values for each computed solution of each function.

The present system is, of course, adaptable to give solutions for any type problem which can be expressed in terms of functions of the type discussed above, not only nuclear weapon effects problems, simply by providing the appropriate computer memory which contains the stored functions. The advantages of the system accrue in each case, and are principally due to the system's capability of reducing complicated data to a more meaningful combination of graphical and digital data groups. Moreover, by having a variable graphical input and digital input capability, the system represents an unprecedented aid to decisional and analytical problems, in that it is possible to work out solutions and assess variations by trial and error, for example, in terms which are comprehensible to mathematically unsophisticated personnel.

It will be realized that the specific problem dealt with in the preferred nuclear effects display system is, to some extent, a simplified version of the general system of this invention. This is due to the fact that the primary effects of radiation blast and thermal flux pressure are isotropic. Hence, it is possible to conveniently reduce the number of graphically depicted variables, $x$ and $y$, to one, i.e., the range about ground zero, which is, under these conditions, a circle. Accordingly, the preferred weapon effects display system employs polar coordinate tracers having but one degree of freedom, i.e., circle radius or range, R, resulting in a greatly simplified plotter system comprised of a plurality of circle generators. Since the detonation event to which each effect is related occurs at a single point, the circle generators may be referenced or aimed at a single common point. Complete versatility of the system in two dimensions is maintained in that means are provided for translating the coordinate screen with respect to the plotter and tracers. It should be realized, however, that the system is readily adapted for representation of nonisotropic effects, such as for example, fallout conditions under unsymmetric meteorological conditions, by modulating the motion of the tracers with respect to $\theta$, the other variable in polar coordinates. This is readily accomplished by providing a suitable servomechanism coupled to the $\theta$ output of a memory device having cartesian coordinates transformed into polar coordinates.

Accordingly, it is a broad object of the invention to provide a method and apparatus for allowing rapid assessment of the solutions to a plurality of related functions.

It is another, more particular object of the invention to provide a method and apparatus for visually displaying the geographical extent of simulated post detonation nuclear "effects" on a map or aerial photograph.

It is a further object to provide a system capable of automatically calculating preselected "effects" of a nuclear detonation from data including the type of nuclear device, environmental conditions, manner of detonation; and automatically displaying the geographical extent of such "effects" by superpositioning geometric figures related in dimension thereto on a map or aerial photograph. For example, these "effects" may include dynamic blast, radiation and thermal characteristics occasioned by a nuclear detonation.

A still further object of the invention is to provide a system as above wherein data pertaining to the type of device, manner of detonation, environmental conditions and other independent characteristic parameters may be individually varied to cause a generally simultaneous change in the displayed extent of such nuclear detonation "effects."

It is a further important object of the invention to provide a system which is capable of rapidly determining the type of nuclear device, manner of detonation and other like parameters required to cause certain nuclear detonation "effects" to extend over a selected geographical area which is visually indicated by superimposed geometric figures on a background map. For example, it may be desired to encompass a given geometrical area with a preselected amount of nuclear radiation, e.g., gamma radiation, and to quickly determine the characteristics of a nuclear device capable of generating the required radiation intensity.

Accordingly, we have devised a method and apparatus for automatically simulating post detonation "effects" of a nuclear device and, simultaneously, visually displaying the range extent of these effects directly onto a background map. More specifically, an analogue computer portion of the invention comprises a series of electronic and mechanical analogue devices suitably adapted to store predetermined functional relationships between a first and second set of parameters. The first set of parameters includes such characteristics as the type of nuclear device, its equivalent TNT yield, the altitude at which it is deployed, and environmental conditions. Included in the second set of parameters are typically salient "effects" that result from a nuclear detonation, for example, blast, thermal and radiation characteristics as functions of the distance from the deployed device. Interfaced with this analogue computer is a display apparatus comprising a means for visually presenting a geographical map or alternatively an aerial photo-map and a plotter means for superimposing thereon a multiplicity of geometric figures, e.g., concentric circles, each independently responsive in dimensions to an output from the analogue computer. The display also comprises a readout means for numerically representing the magnitude of the effects and the ranges at which they occur. The area generally defined on said map by each of these figures is preselectively representative of the geographical extent of a particular nuclear "effect" for a given magnitude thereof. For example, a superimposed circle, concentric with the projected ground position of an elevated device, may represent an encompassed area on the map subjected to at least a given level of a radiation "effect." Concomitantly with this representation, both the general shape and size of such geometric figures are responsive through said interface to an output of the analogue computer. This unique organization provides for the generation of superimposed figures on a background map, functionally related in dimensions to the geographical extent of each of the above-described simulated post detonation nuclear "effects." More particularly, in operation of the system, values corresponding to the first set of parameters, e.g., yield of a nuclear device, are selected and introduced as analogue electrical signals into an input portion of the analogue computer. Further, a desired threshold magnitude for each of the hereinbefore mentioned "effects" is selected and fed into the analogue computer. In response to this introduced data, a computation operation is performed, and pursuant to the stored analytical and empirical relationships, the analogue computer provides at an output portion thereof a series of signals representative of the geographical extent of each of said second set of parameters, namely each of the "effects." Communicative with this output, the display system exhibits a series of geometric figures, for example, color-coded concentric circles, each defining at the perimeter thereof a range from ground zero at which the given magnitude of effect occurs. Generally, the area within each circle will represent a geographical expanse subjected to an effect having a magnitude at least equaling the given value thereof. Thus the area encompassed by each figure visually indicates on the map the range extent of each given "effect" magnitude.

Our invention has particular importance in the field of nuclear weaponry. The ability to rapidly and precisely evaluate the interrelationships between nuclear weapon "effects" and the environmental characteristics associated with a target area provided by this invention is invaluable to military strategists. For example, with this automated display system, efficient utilization of low yield nuclear weapons by exacting placement is possible. Moreover, misjudgments in the placement or selection of nuclear weapons are minimized by providing a pictorial display of the predicted extent of destruction, thus decreasing the probability of catastrophic errors.

Further uses of the invention include war-gaming, military education and weapon design. Medical evaluation is also a possible use, wherein medical experts would be capable of rapidly determining the probable extent of radiation exposure to troops.

Further objects, features and applications will become apparent upon consideration of the following detailed disclosure of several exemplary embodiments of the invention, in conjunction with the appended drawings, in which:

FIG. 1.*a*. is a composite block diagram and pictorial view of a preferred nuclear "effects" computation display system.

FIG. 1.*b*. is a composite block diagram and pictorial view of an alternate nuclear "effects" computation display system.

DESCRIPTION OF THE PREFERRED EMBODIMENTS

Figure 1A:
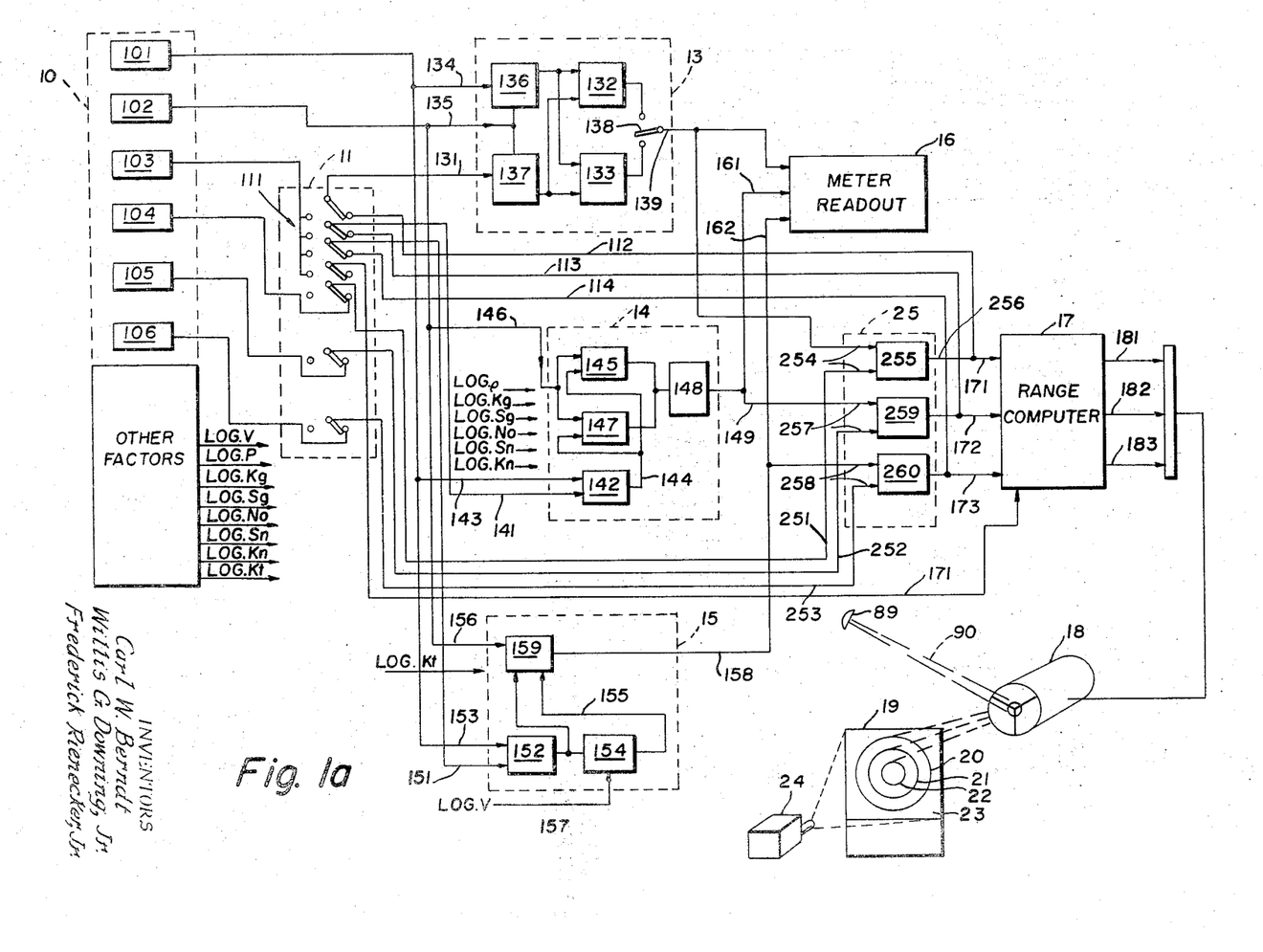

Referring now to FIG. 1.*a*., a block diagram of a computation apparatus and a pictorial view of a display apparatus is shown for a nuclear "effects" computation-display system. Briefly, at least two distinct modes of operation for the system are possible.

In a first mode, a ground range is given and the magnitudes for blast, radiation and thermal effects are computed for this range. Particularly, data representing a height of burst, hereinafter denoted as HOB (the altitude at which a nuclear device is detonated), a ground range (distance from ground zero at which a preselected magnitude of an "effect" occurs), and a yield of a nuclear device (expressed in equivalent tons of TNT) is introduced into the system by means of data input unit 10. In response thereto, electrical signals analogous to this data are directed by a mode control unit 11 to an analogue computer complex comprising blast, radiation, and thermal analogue computers 13, 14 and 15. Therein, computation operations are performed, yielding analogue electrical signals representative of blast pressures, radiation intensities and thermal flux. These latter parameters are generically termed herein as "effects" of a nuclear detonation. The magnitudes of these "effects" are displayed on meter readout unit 16 by a series of electrically responsive meters (not shown). Furthermore, the input data signal corresponding to a selected ground range is transconducted through mode control unit 11 to a range computer 17 wherein a signal conversion takes place, rendering a control signal for operating a "circle generator" 18. More specifically, "circle generator" 18 is a servomechanism for generating on screen 19 a series of concentric color-coded circles of light 20, 21 and 22, each having a variable diameter responsive to the output of range computer 17 and thus the range data signals. The radius of circles 20, 21, and 22 indicate a range value at which a particular magnitude of an "effect" occurs on a displayed strategical background map 23 as projected on screen 19 by projector 24. For this first mode, a single selected ground range is given and introduced into the system, and thus circles 20, 21 and 22 are superimposed upon each other and indicate a single range radius, and thus a single annularly defined area on map 23. Within this indicated area, the magnitudes of the "effects" for blast, radiation and thermal flux are generally at least as great as those shown on meter readout unit 16, and calculated by computers 13, 14 and 15.

For a second mode of operation, data is introduced into data input unit 10 pertaining to a given HOB, yield and magnitude for each of the "effects" inclusive of blast pressures, radiation intensity and thermal flux. In this mode, a ground range for each given effect magnitude is computed, rather than the magnitudes of the "effects" for a given ground range.

More particularly, a feedback operation is utilized to calculate a ground range signal for each effect, wherein a ground range is defined by the given effect magnitude, a given HOB and a given yield. For each effect, blast, radiation and thermal, the given magnitudes therefor are compared by comparator circuit 25 with simulated magnitudes for each effect provided by the outputs of computers 13, 14 and 15, the comparator output providing a feedback function of ground range which is used to represent a ground range input signal for computers 13, 14 and 15. Accordingly, the feedback ground range signal causes a change in the simulated effects output signals in response to differences exhibited between the given magnitudes effect and the simulated effect magnitudes, causing a convergence therebetween and the generation of feedback ground range signals which cause the outputs of each of computers 13, 14, and 15 and to satisfy the given magnitudes for each effect. Thus, computation of a ground range signal for each of a given blast, radiation and thermal effect is performed. These calculated ground range signals are tapped off the output of comparator circuit 25 and are introduced into range computer 17, wherein the analogue signals are converted into suitable control signals for actuating "circle generator" 18 as described above. Thus, in this second mode, each of color-coded circles 20, 21 and 22 visually depict the ground range (i.e., radius) extent on map 23 for each of the selected "effect" magnitudes (blast pressure, radiation intensity and thermal flux) and for a given HOB and yield. Concurrently with the above operation, each selected "effect" magnitude is displayed by calibrated meters (not shown) on meter readout unit 16.

In design, data input unit 10 is comprised of a multiplicity of linear, single-turn potentiometer means 101, 102, 103, 104, 105 and 106, adapted with logarithmically calibrated dials. Each potentiometer provides for setting and thus selection of individual input data parameters for processing by computers 13, 14 and 15. Such data includes values for the height of burst 101, HOB, (in feet); ground range, 103, (distance in feet from ground zero at which a particular magnitude of an "effect" occurs); yield, 102, (in ton equivalent TNT), blast pressure, 104, (in p.s.i.); radiation intensity, 105, (in RADS); and thermal flux, 106, (in Cal/cm$^2$). Also, introduction of other influential parameters are preferably provided for in this unit, such as atmospheric visibility, V, air density, $\rho$, gamma and neutron radiation shielding, $Sg$ and $Sn$, type of weapon, $No$, (e.g., fission and fusion), and surface burst factors, $Kg$, $Kn$ and $Kt$. Each of these potentiometers incorporated in data input unit 10 are suitably arranged with DC sources to provide a voltage signal having a logarithmic analogue relationship with each corresponding parameter. These logarithmic input signals are directed through mode control unit 11 to selected components of the system according to the particular mode of operation, as described above.

Mode control 11 is comprised of a multipole switch 111 to provide guidance of the above input signals to the appropriate components. Switch 111 is shown in the second mode position, and accordingly, ground range potentiometer 103 is disconnected from the circuit, while effect potentiometers 104, 105 and 106 are connected by switch 111 to comparator circuit 25 and meter readout 16. The feedback ground range signals $f(\text{Log } Rp)$, $f(\text{Log } Rrad)$ and $f(\text{Log } Rt)$ appearing on lines 112, 113 and 114 are directed by switch 111 to range signal inputs 131, 141 and 151 of computers 13, 14 and 15, Conversely, when switch 111 is in the first mode position, ground range potentiometer 103 is connected to inputs 131, 141 and 151 of computers 13, 14 and 15 and to range computer 17 via line 171, while effects potentiometers 104, 105 and 106 are disconnected.

Figures 2, 3:
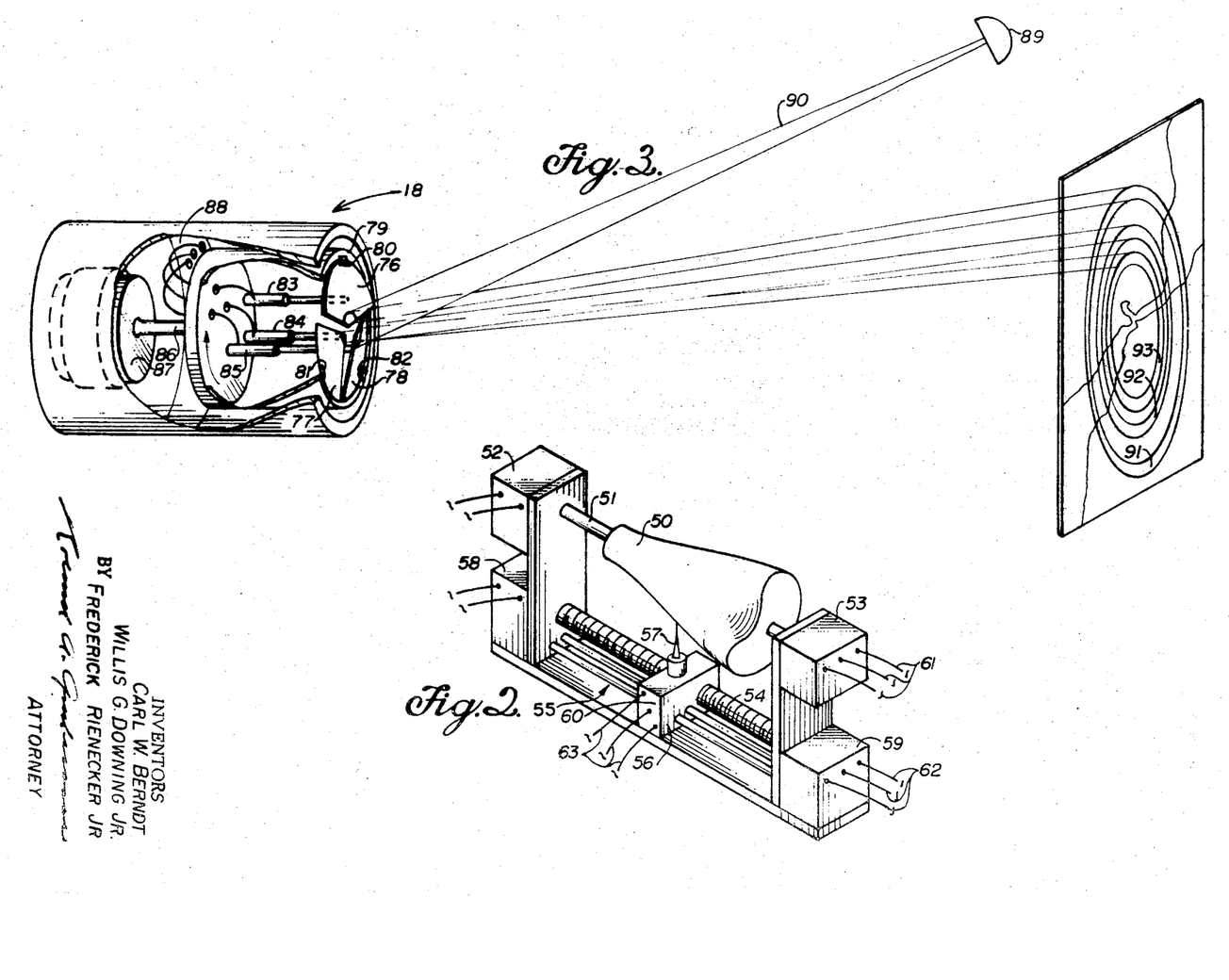
FIG. 2 shows a perspective view of a mechanical cam analogue device used for computing blast "effects" in the system of FIG. 1.*a*.
FIG. 3 depicts an apparatus used in the system of FIG. 1.*a*. for generation of a plurality of variable diameter concentric color-coded circles of light on a viewing screen.

In general, computers 13, 14 and 15 are constituted from variable diode function generators, electronic operational amplifiers, and, where electronic analogue devices are unsuitable, from mechanical analogue cams such as shown in FIG. 2 and described herein. For the solution of analytical equations, operational amplifier summing circuits are utilized, while the solutions of nonanalytical empirical relationships are provided by the diode function generators and/or mechanical cam units. All computations provided by computers 13, 14 and 15 are performed in logarithms to permit a wide range of magnitudes for each variable, without requiring large voltage deviations of the analogue signals. For example, a 10-volt variation in the analogue signals has been found sufficient to encompass practical ranges for the variables on a logarithmic scale. Furthermore, a high degree of precision is afforded at these low voltage levels. Further still, analogue computation is significantly simplified with logarithmical representation as multiplication of variables is conveniently performed by signal addition by means of electronic operational amplifiers.

In particular, blast computer 13 provides selective calculations for a peak overpressure and dynamic pressure. Overpressure is essentially a prevailing, relatively slow increase in pressure from the normal atmospheric value, proximate a nuclear detonation. Dynamic pressure, as distinguished from overpressure, is a shock or pulse wave of high pressure gases originating at ground zero and propagating radially therefrom. Both of these parameters are nonanalytical functions of HOB, yield and ground range, and accordingly can be represented by a mechanical cam apparatus as shown in FIG. 2. Therein, a three-dimensional cam shaped body 50 is rotatably disposed on a shaft 51, with a motor-driven servomechanism 52 and a position (angular) sensing potentiometer 53 mounted on opposite ends of shaft 51. Parallel to shaft 51, a cam follower screw guide 54 is rotatably disposed and provided with a cam follower 55, which engages guide 54. Guide 54 is comprised of a holder 56 and spring-loaded projection 57 slideably mounted therein. A servomechanical drive 58 is provided at first end of guide 54 for axially positioning follower 55. A position-sensing potentiometer 59 is disposed at a second end of guide 54 for detecting the longitudinal or axial position of follower 55. Projection 57, upon rotation of body 50 or axial displacement of follower 55, follows the curvature of body 50 and drives a radial displacement sensing potentiometer 60 located within holder 56. Each of potentiometers 53, 59 and 60 is provided with a set of leads 61, 62 and 63, which are suitably connected to a set of DC sources (not shown) for providing a wiper arm terminal lead for each, and analogue voltage signal representing the position thereof within the potentiometer, and thus indicating the disposition of body 50, follower 55 and projection 57.

For blast computer 13, two mechanical cams 132 and 133 are included as shown in FIG. 1.a., one for peak overpressure and one for dynamic pressure. In each case, cam bodies 50 are machined for a reference 1 kiloton yield, such that the radius at any point on the surface thereof is proportional to the logarithm of the pressure represented. The axial distance along body 50 is proportional to the logarithm of the ground range. Essentially, the three-dimensional shape of body 50 stores the functional relationship between these parameters. For these dimensions, the sensing potentiometers 59 and 60 are linear, and accordingly, the outputs thereof represent the logarithmic functions of pressure and ground range. The angular displacement of cam body 50 is proportional to the antilogarithm of HOB. To provide a logarithmic output, sensing potentiometer 53 is unsymmetrically loaded by a low resistance load disposed across a terminal end and wiper arm lead thereof to provide a skewed output conforming to the logarithm of the HOB.

To allow representation of overpressure and dynamic pressure for yields other than 1 kiloton, analogue signal inputs for Log (HOB) and Log (Ground Range) appearing at inputs 134 and 131, respectively, are, prior to introduction into the mechanical cam, converted by a multiplication factor $W^{1/3}$, where Log W is the yield signal appearing an input 135. This operation is performed logarithmically, by signal addition using electronic operational amplifier means 136 and 137. The empirical relationships between peak overpressure and dynamic pressure as functions of HOB, ground range and yield may be obtained from "The Effects of Nuclear Weapons," U.S. Atomic Energy Commission, Washington, D.C., Apr., 1962. Thus in operation, two mechanical cams 132 and 133 in blast computer 13 compute a peak overpressure and dynamic pressure in response to analogue signals introduced at 134, 135 and 131, representing a HOB (ground range) and (yield). In one embodiment of the invention, suitable variations for the parameters were 0—3000 feet, HOB; 100—10000 feet, ground range; and 1—1000 p.s.i. for both peak over and dynamic pressures. Selection for either peak overpressure or dynamic pressure is made by switch 138, the common terminal of which provides an output for blast computer 13 at 139, denoted F(Log B).

The design and operation of radiation computer 14 provides for separate calculation of neutron and gamma radiation intensity. This characteristic is preferable in view of substantial differences in production, transmission and attenuation of these two prevalent types of radiation. Subsequent to individual computation, the intensities of the gamma and neutron radiation are summed, providing a total radiation "effect." In construction of computer 14, both operational amplifiers and variable diode function generators are utilized to store the herein-disclosed analytical relationships and compute particular solutions thereof. Both types of radiation are calculated as a function of slant range, i.e., the distance from an elevated nuclear device to the perimeter of a ground range radius. Particularly, the formula is:

$$D = \sqrt{HOB^2 + R^2} \qquad (1)$$

where D is the slant range, HOB is the height from ground level of the deployed device (i.e., ground zero), and R is the ground range. Equation (1) is solved in logarithmic form by slant range computer 142 having inputs 143 and 141 for Log HOB and Log R, where the equation is:

$$\text{Log} \sqrt{1 + \left(\frac{H}{R}\right)^2} + \text{Log } R \qquad (2)$$

$\text{Log} \sqrt{1 + \left(\frac{H}{R}\right)^2}$ is generated by a variable diode function generator and is added to Log R to provide an analogue signal representing Log D which appears on line 144 in radiation computer 14. Gamma radiation may be formulized as:

$$Ig = \frac{3.2 \times 10^9}{D^2} e^{-D/360} \qquad (3)$$

where Ig is the gamma intensity in Roentgens scaled to a 1-kiloton yield. To preferably correct for other yields, various air densities, gamma radiation shielding and surface detonations of a device, i.e., HOB less than $180W^{0.4}$, the complete equation in logarithm form becomes:

$$\text{Log } Ig = \text{Log } Kg - \text{Log } Sg + \text{Log } W + \text{Log } F_3(w)$$
$$+ \text{Log } 2.88 \times 10^7 - \text{Log } D^2$$
$$+ \text{Log } 10 - 4.45 \times 10^{-4} \rho D \qquad (4)$$

Kg is an empirical factor introduced for surface detonations, Sg is another empirical factor representing the influence of gamma radiation shielding for a particular target, W is yield in tons, D is the slant range in feet, and $\rho$ is the observed air density. This equation is computed by gamma computer 145. While the calculation for gamma radiation may omit variable Kg, Sg and $\rho$ using average constants therefor, these parameters are preferably included and introduced as shown in logarithmic form by means of data input unit 10. $F_3(W)$ is a correction factor function for different yields, Log (W) appear at input 146, and F3(W) is produced in response to Log (W) by a variable diode function generator within gamma computer 145. For derivation of equations 1, 2, 3 and 4, see "The Effects of Nuclear Weapons," U.S. Atomic Energy Commission, Washington, D.C., Apr. 1962. Equation 4, as shown in logarithmic form, is adapted for computation by conventional electronic summation in operational amplifiers suitably arranged to add the analogue signals associated with each component of the equation. See Control System Analysis and Synthesis, McGraw Hill, 1960.

An approximate equation for neutron flux is:

$$Fn = \frac{8.6 \times 10^{18}}{D^2} W e^{-D/210} \qquad (5)$$

where Fn is neutron flux in neutrons/cm², D is the slant range in yards, and W is the yield in tons. Equation 4 represents an average between neutron production from fission and fusion nuclear devices. Using a conversion factor, 1 neutron/cm² = $1.8 \times 10^{-9}$ Roentgens, and including an empirical factor, No, to correct for the type of nuclear device; an air density variable, $\rho$; a surface detonation factor Kn and a neutron shielding factor Sn, equation (5) in logarithmic form becomes:

$$\text{Log } Fn = \text{Log } No + \text{Log } Kn - \text{Log } Sn + \text{Log } W$$
$$+ \text{Log } 2.32 \times 10^8 - \text{Log } D^2$$
$$+ \text{Log } 10 - 7.6 \times 10^{-4} \rho D \qquad (6)$$

where Fn is expressed in Roentgens. For the derivation of equation (6), see Effects of Nuclear Weapons, ibid. As with equation (4), equation (6) is readily computed by conventional analogue signal addition in neutron computer 147, presenting a signal for Log Fn in Roentgens. Factors No, Sn, Kn and $\rho$ may be preprogrammed into the computer using average values therefor, but are preferably included as variables and introduced in logarithmic form from data input unit 10.

For the first mode of operation of the system shown in FIG. 1.a., gamma and neutron radiation are individually computed and the analogue signals thereof are summed by summation circuit 148, presented at output 149, and directed along line 161 as $F(Log(Ig+Fn))$, wherein the results are indicated by a logarithmically calibrated meter. At variance with this operation, in the second mode, the analogue signals for both types of radiation are electronically summed to provide a total calculated radiation "effect" for comparison by comparator circuit 25, with a selected total radiation "effect" introduced by data input unit 10. As discussed infra, in relation to the general operation of the system of FIG. 1.a., this comparison operation provides for computation of a ground range signal for a total radiation "effect."

Thermal computer 15 is included in the system shown by FIG. 1.a. for the computation of a thermal flux, generated by a nuclear explosion and delivered to a target area. As in the design of radiation computer 14, thermal flux is computed as a function of slant range D which is computed individually by a slant range computer 152 as a function of HOB and range appearing at inputs 153 and 151. Additionally, an atmospheric transmissivity factor T, which influences the propagation of thermal energy, is introduced. The formula utilized is found in Effects of Nuclear Weapons, ibid, and in reduced form is represented as:

$$Q = 10^{12} \frac{WT}{12D} Kt \qquad (7)$$

where D is the slant range, T is the transmissivity factor, W is the equivalent yield in tons, $Kt$ is a factor introduced for a surface detonation, and Q is the thermal flux in cal/cm². Transmissivity T is a function of slant range D and visibility V and in particular, the formula therefore is:

$$T = e^{-3.91 \frac{D}{V}} \left(1 + .7 \frac{D}{V}\right) \qquad (8)$$

For derivation of equation (7), see Capabilities of Nuclear Weapons, (U) U.S. Army publication, TM-23-200, Feb. 1964 (CDI-3). The equation for Q, as arranged for calculation by thermal computer 15, is:

$$Log\ Q = 4.46 + Log\ W + Log\ T$$
$$- 2\ Log\ D + Log\ Kt \qquad (9)$$

where $Log\ D = Log\ R + F_1\left(Log\ \frac{H}{R}\right)$, and is generated by slant range computer 152. Log T is generated by a variable diode function generator 154 in response to Log K appearing on line 155, and Log V introduced from data input unit 10, according to an empirical relationship provided by the above reference on atmospheric transmissivity. For practical situations, transmissivity T varies over a range inclusive of 0.5 to 1.0.

The components required for computation of equation (9) are the same as disclosed for radiation computer 14, and comprise an operational amplifier means 159, suitably provided with input and feedback resistors for electronic summing of each analogue signal representing the components of the equation. The particular arrangement of the function generators and operational amplifiers provide a storage means for the thermal equation, allowing for calculations of particular solutions thereof. Thus, for the first mode of operation, in response to analogue signal data defining a selected HOB, ground range, yield and visibility, appearing respectively at inputs 153, 151, 156 and 157, thermal computer 15 provides an output signal, Log (Q), at output 158, analogous to the thermal flux as characterized by the given data. Similarly as described above, for computers 13 and 14, the output thermal "effect," Q, signal is directed to meter readout unit 16 along line 162 and displayed thereon. In the second mode, thermal computer 15, together with comparator circuit 25, calculate the ground range for a given thermal "effect" magnitude, i.e., Log $Z_o$. The signal analogous to the computed ground range (Log $R_Q$) is introduced into range computer 17, and pursuant thereto, a circle is generated on screen 19 having a diameter corresponding to the ground range extent of the given thermal "effect" value (Log $Q_o$). Specific construction and operational details of computers 13, 14, and 15 may be found in UCRL-14966, "Weapon Effects Display System Design and Maintenance Reference Manual (Opto-Mechanical System)," June 24, 1966; and UCRL-50130, "Weapons Effects Electronic Display System Maintenance Manual," Nov. 23, 1966, both of Lawrence Radiation Laboratory, Livermore, California 94550.

As discussed above, mode control unit 11 provides for the selection of a first and second mode of operation. In the second mode, i.e., calculation of ground ranges for given "effect" magnitudes, comparator circuit 25 provides a set of feedback elements for balancing the output signals for the "effects" appearing on lines 139, 149 and 158 from each of computers 13, 14 and 15; with the data input analogue signals representing given "effect" magnitudes appearing on lines 251, 252 and 253. For example, in computing the ground range for a given peak overpressure a desired magnitude thereof, $P_o$, is set on data input unit 10 by potentiometer 104, thus introducing into comparator circuit 25 an analogue signal for Log $P_o$. Concurrently therewith, a second analogue signal, Log P, presented by output line 139 from peak overpressure cam 132 of blast computer 13 is likewise fed into comparator circuit 25. These two analogue signals appear at input 254 of comparator 25 and are compared by a servomechanism 255, whereupon a signal proportional to the difference between Log $P_o$ and Log P is issued at output 256. The signal appearing at output 256, being a function of Log ($P_o - P$), is directed back over line 112 through switch 111 of mode control 11 to range input 131 of blast computer 13, wherein the range drive servomechanism 58 of mechanical cam 132 is actuated by the signal representing Log ($P_o - P$). Accordingly, follower 55 of cam 132 is driven until the analogue pressure output, Log P on line 139, equals Log $P_o$, balancing input 254 of comparator circuit 25 and terminating the search for the ground range associated with the given blast effect magnitude $P_o$. More specifically, upon reaching a balance at input 254 of comparator circuit 25, the signal appearing on line 112 represents a value for the logarithm of ground range satisfying the solution of the blast function defined by the given peak overpressure $P_o$, HOB and yield. Accordingly, the ground range analogue signal Log $R_p$ on line 112 is directed to an input 171 of range computer 17.

In generally the same manner, ground range signals for each "effect," dynamic blast pressure, gamma and neutron radiation and thermal flux are computed. However, for the radiation and thermal "effects," integrating compensation networks 259 and 260 have been used in one embodiment of the invention in comparator circuit 25 to provide enhanced comparison of signals, in place of the servomechanism 255 described above. Integral compensation networks (also referred to as log compensators) are disclosed in Control Systems Analysis and Synthesis, McGraw Hill, 1960, New York. More particularly, comparator circuit 25 receives a given radiation effect and a simulated radiation effect; and at input 257, signals representative of a given thermal effect and a simulated thermal effect. Accordingly, ground range signals Log $R_{rad}$ and Log $R_Q$ are issued on lines 113 and 114, which signals represent particular ground range solutions to the radiation and thermal equations for a given radiation and thermal effect.

Alternatively, each section (255, 259 and 260) of comparator circuit 25 may be incorporated within each associated computer 13, 14 and 15, to provide a set of computer means, each individually capable of computing selectively an effect magnitude for a given ground range or a ground range for a given effect magnitude.

As briefly disclosed, range computer 17 receives analogue signals in logarithmic form, each representative of the ground range for each "effect": blast (alternatively peak overpressure or dynamic pressure), appearing at input 171; radiation (combined gamma and neutron), appearing at input 172; and thermal flux, appearing at input 173. The elements of computer 17 comprise a set of variable diode function generators for electronically generating the antilogarithms of the ground range log signals. Subsequent to this conversion operation, the antilogarithmic ground range signals are directed to "circle generator" 18, also shown in FIG. 3, which, in response to a blast, radiation and thermal ground range analogue signal appearing on lines 181, 182 and 183, generates on screen 19 circles 20, 21 and 22. More particularly, "circle generator" 18 (shown in detail in FIG. 3) comprises a rotatable threefold segmented scriber apparatus, having mirror segments 76, 77 and 78, each pivotably mounted to cylindrical frame 79 by spring-loaded hinges 80, 81 and 82. Three linear drive servomechanisms 83, 84 and 85 are arranged within frame 79, each having a drive projection contacting mirror segments 76, 77 and 78 for forcing each segment in an outwardly direction in response to an electrical signal applied to said servomechanisms. Frame 79, inclusive of the mirrors and servomechanisms mounted thereto, is rigidly and coaxially fixed to shaft 86 and rotated at a constant speed by motor 87. A rotating contact means 88 is provided at a distal end from mirror segments 76, 77 and 78, to allow electrical access to the servomechanisms during rotation of frame 79. In operation, light beam source 89 is disposed to direct a light beam 90 onto the central position of intersection of mirror segments 76, 77 and 78 of the scriber apparatus, wherein the diameter of beam 90 is of a suitable size to cover a substantial proportion of each mirror segment. Accordingly, with frame 79 rotating, and with each segment 76, 77 and 78 differentially displaced outwardly as shown in the drawing, beam 90 is reflected off the mirror surfaces, generating three concentric circles 91, 92 and 93 on a plane generally normal to the mirrors. In a preferred form, mirror segments 76, 77 and 78 are suitably coated to provide reflection of a different colored light from each, and thus provide color coding for each of circles 91, 92 and 93. To minimize "flicker," an effect exhibited by the manner of generating circles 91, 92 and 93, a suitable rotation speed for frame 79 is approximately 1800 r.p.m.

The particular means described herein for generating a plurality of geometric figures on a screen has proved to provide exceptional brightness in the displayed circles, allowing enhanced visibility thereof even in the presence of significant background light. However, other circle generation means may be used if desired, such as servomechanically adjustable, annular apertures disposed proximate a high intensity light source for projecting variable diameter circles on a distal screen.

In FIG. 1, map projector 24 comprises a simple slide projection means capable of displaying selected strategical maps or aerial-to-ground photographs on screen 19.

Figure 1B:
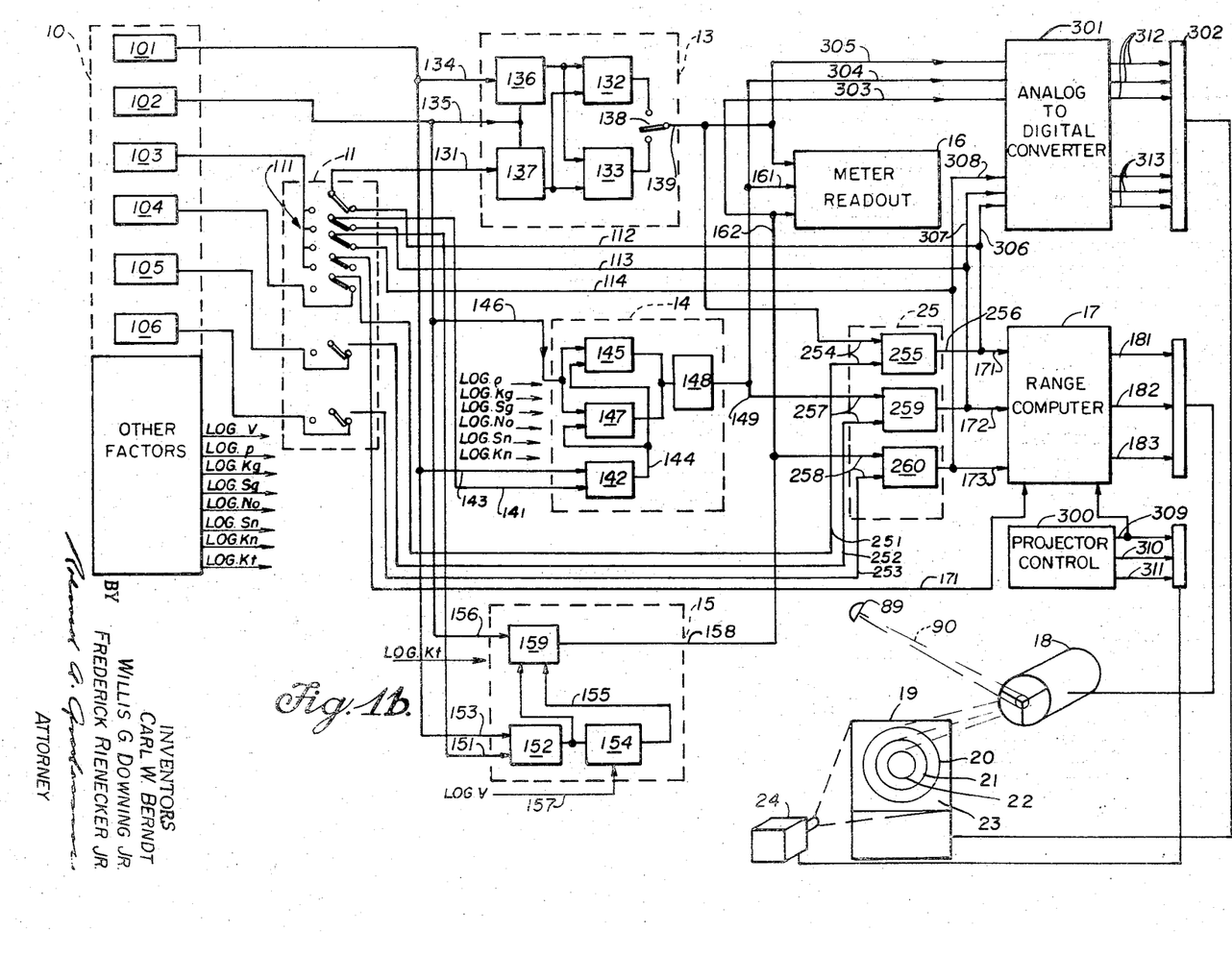

Alternatively, the system may include the components shown in FIG. 1.b, consisting of a projector control unit 300, an analogue-to-digital converter 301, and a digital readout unit 302. Furthermore, in such an embodiment, range computer 17 and projector 24 are modified to operate in conjunction with projector control unit 300. Analogue-to-digital converter 301 is connected via lines 303, 304 and 305 to receive signals representative of the magnitude of the detonation effects. Furthermore, the range data signals from comparator circuit 25 are connected to digital-to-analogue converter 301 by means of lines 306, 307 and 308.

In response to a change in these analogue signals to digital form, converter directs digitized signals to digital readout unit 302 by line sets 312 and 313, wherein the above-mentioned signal data and computation results are presented in numerical form. Digital readout unit 302 is included to provide convenient visual display to a large audience of the above suggested salient parameters. This unit, in combination with the pictorial display of the geographical extent of the nuclear "effects" on screen 19, provided by map projector 24 and "circle generator" 18, provide for a rapid assessment of the entire spectrum of "effects."

Furthermore, a projector control unit 300 is adapted in combination with a modified map projector to provide a remote control of a film map. More particularly, projector 24, for this embodiment, is comprised of servomechanically responsive components: magnification apparatus, film holder assembly having two dimensions of motion including rotation, brightness adjustment and focus control. As these features of projector 24 in themselves are conventional, they have not been shown in the drawings. Projector control unit 300 contains all the electrical signal generation means and associated outputs appearing on lines 309, 310 and 311, required to motivate each of these servomechanisms, including a "control stick" having two degrees of freedom for remotely moving the film holder assembly in a scanning mode. This scanning mode, together with the magnification control, allows any selected point on the projected map to be brought into prominence on screen 19. In one embodiment of the invention, a modified version of a commercially available projection apparatus, VARISCAN film interpreter, by Nuclear Research Instruments, was used. For this device, any standard size roll film may be used, but for our application, 9½-inch roll film, used in aerial reconnaissance is preferable.

Additionally, projector control unit 300 feeds a magnification control signal and a map scale signal, selected therein, to range computer 17, via lines 309. Range computer 17, as modified for this embodiment, provides for scaling the analogue ground range signals received at inputs 171, 172 and 173, in accordance with a magnification and a map scale signal presented by projector control 300 along lines 309. More specifically, range computer 17 calculates a set of proportional analogue ground range signals suitable for actuating "circle generator" 18 in response to signal data representative of the ground ranges, the nominal map scale, and the map magnification factor. This operation is performed in logarithmic form by electronic addition, wherein the resulting ground range log signals are converted to antilogarithmic presentation by variable diode function generators, as described above. For a summary of the construction details of the system shown in FIG. 1.a., reference may be made to UCRL-14966, "Weapons Effects Display System," June 24, 1966; UCRL-14967, "Weapons Effects Electronic Display System," July 21, 1966; and UCRL-14968, "Weapons Effects Display System," July 1, 1966; all of which may be obtained from Lawrence Radiation Laboratory, Livermore, California.

A further embodiment of the invention (not shown) has been constructed using a television (raster) display in place of the herein-described optical mechanical projection display. In this former embodiment, a color television projection system is interfaced with the output from range computer 17, and projector control 300 is replaced with an analogous control unit for operating the television projector. A television camera is utilized to monitor and display a selected map on a suitable screen, while raster pattern generating circuits are provided for superimposing geometric figures of diverse shapes thereon. Significantly, with this latter embodiment, more versatility is offered in the display of color-coded ground range indicative patterns. For example, it is possible to depict the shape and extent of simulated radiation fallout, generally of a noncircular shape, by generation of ellipses and lissajous patterns on the television screen. See UCRL-50130, "Weapons Effects Electronic Display System," Nov. 23, 1966, Lawrence Radiation Laboratory, Livermore, California.

In summary, we have described several embodiments of a system for the computation and display of simulated "effect" parameters predictable for a nuclear detonation. However, while the invention has been described in terms of nuclear detonations, application of the invention itself are recognized for the display of the effects attendant conventional chemical explosives or the like. It is readily appreciated that, with appropriate substitutions for the blast and thermal equations disclosed herein for equations definitive of the "effects" of conventional explosives or weapons, an apparatus suitable for the display of the simulated "effects" thereof may be embodied. Moreover, the above disclosure is by way of example, and is not intended to limit the scope of the invention; rather for this latter purpose, reference is to be made to the following claims.

We claim:

1. Apparatus for determining relationship between characteristics of an explosive and the effect and range thereof comprising:
   a. an input means including a plurality of potentiometers, adapted with voltage sources and calibrated to provide selection and generation of a logarithmic analogue voltage signal representative of a first set of parameters comprising a height of explosive burst and an explosive yield, and a second set of parameters corresponding to a resulting explosive "effect" and a ground range corresponding to said explosive effect therefor;
   b. an analogue computer means including a multiplicity of analogue components arranged to store the relationships between said first and second set of parameters, wherein said computer means in response to the analogue signal of the first set of parameters and one of the second set of parameters, calculates the remaining parameter of the second set and produces an analogue voltage signal representative thereof;
   c. a display means comprising a map portrayal means for characterizing a geographical expanse and a plotting means, response to a ground range signal from said analogue computer means and for superimposingly charting on said area at least one geometric figure indicative of an area on said expanse, encompassed by said effect parameter; and
   d. a readout means, responsive to a computed effect analogue signal from said analogue computer means for indicating the magnitude of said computed effect for said ground range parameter.

2. The apparatus recited in claim 1 further defined by said explosive being a nuclear explosive, and said effect being at least one of the group consisting of a blast effect, a radiation effect and a thermal effect.

3. An apparatus for determining explosive effects resulting from a nuclear detonation, comprising:
   a. means for generating discrete first electrical signals having values corresponding to the yield and height at which a nuclear device is detonated;
   b. means for generating a second electrical signal having a value corresponding to a desired ground range of said effects;
   c. means for generating a plurality of individual third electrical signals, each of said third electrical signals corresponding in value to a desired blast, radiation and thermal effect;
   d. first, second and third analogue computer means, including input and output means, each computer means including analogue storage and signal comparison means for making computations of the blast, radiation and thermal effects and ground ranges therefor; said computer means being connected for receiving both said first electrical signals, means including a switch for connecting said second electrical signal to said computer means for computing in a first mode said blast, radiation and thermal effects based upon input signals received, and for connecting at least one of said third signals to said computer means for computing in a second mode a ground range therefor based upon input signals received; feedback means connecting said comparison means to said analogue storage means during the second mode of operation;
   e. readout means for numerically indicating values of said effects; said readout means communicative with said computer output means; and
   f. display means including a source of light, a screen, a segmented disc for reflecting light onto said screen and a means for providing relative rotation between said screen and said discs; control means for individually operating said discs for varying the angle of light reflection therefrom, said control means for each disc being connected for receiving the output from a distinct one of said computers; whereby in the first mode of operation said readout means may indicate calculated values for said effects while said display means indicates a light segment for a particular range determined by the value of said second signal, and whereby in the second mode of operation the readout means may indicate values for said effects corresponding to said third electrical signals while said display means indicates calculated range signals as distinct light segments, each associated with one of said blast, radiation and thermal effects.